United States Patent Office 2,873,568
Patented Feb. 17, 1959

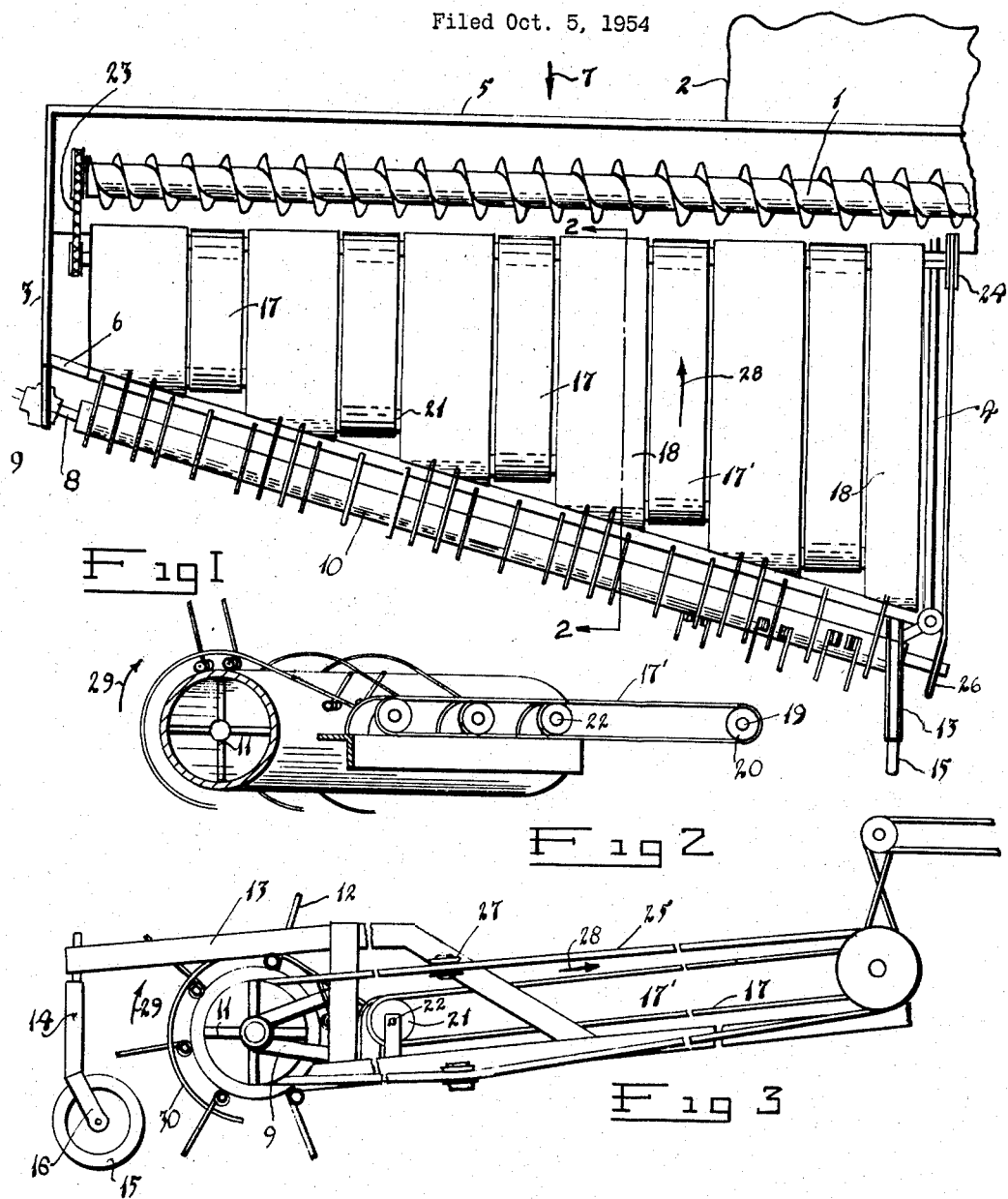

2,873,568

GRAIN SWATH PICK-UP ASSEMBLY FOR COMBINES AND THE LIKE

Adam H. Legary, Pilot Mound, Manitoba, Canada

Application October 5, 1954, Serial No. 460,433

1 Claim. (Cl. 56—345)

My invention relates to new and useful improvements in pick-up for swathers or combines and the like, the principal object of my invention being to provide a device of the character herewithin described in which the pick-up drum is adapted to attack the swath at an angle to the swath line, thereby making for a more efficient pick-up of the swath.

A further object in conjunction with the foregoing object is to provide means within said device for conveying the swath from the forward pick-up to the conventional pick-up of the swather or combine.

Yet another object of my invention is to provide a device of the character herewithin described which is readily adapted for use with conventional swathers or combines.

A still further object of my invention is to provide a device of the character herewithin described which is adapted to be driven from the drive of the swather or combines.

A still further object of my invention is to provide a device of the character herewithin described which is simple in operation, economical in construction, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a top plan view of my device showing the conventional swather pick-up means incorporated therewith.

Figure 2 is an enlarged fragmentary cross-sectional view of my device substantially along the line 2—2 of Figure 1.

Figure 3 is an end elevation of my device taken from the right hand end of Figure 1.

In the drawings like characters of reference indicate corresponding parts in the different figures.

The conventional machines used for cutting swath of grain are adapted to lay the swath in longitudinal lanes with the stalks of the grain running parallel to the longitudinal axis of the swath. However, when this swath is picked up for entry into a combine or the like the conventional combine pick-up attacks the swath so that the tines of the pick-up rotate in a vertical plane parallel to the longitudinal axis of the swath, which means that a certain percentage of the swath is missed due to lack of engagement by said tines.

I have found that the efficiency of pick up is improved if the tines attack the stalks at an angle from the longitudinal axis, and the present device accomplishes this purpose, as well as providing means to convey the swath to the conventional pick-up of the combine after it has been picked up by the front pick-up.

Proceeding now to describe my invention in detail, it will be seen upon reference to the accompanying drawings that I have illustrated a conventional pick-up 1, which, it is to be understood, is situated at the front of a conventional swather (not illustrated) but illustrated in part by dotted line 2. In this embodiment I show an auger type pick-up, but it is to be understood that a conventional pick-up drum having extending tines could be used just as well.

My device comprises a supporting framework including side members 3 and 4 extending forwardly of the conventional pick-up framework 5. It will be observed that the side member 4 is considerably longer than the side member 3, so that the front member 6 joining the ends of the side members 3 and 4 lies at an acute angle from the longitudinal axis of the device (indicated by arrow 7) instead of being at right angles thereto, as would be the case if the sides were of equal length.

A pick-up drive shaft 8 is journalled for rotation within bearings 9 adjacent the front ends of the sides 3 and 4, said shaft being substantially parallel to the afore-mentioned front member 6. A pick-up drum 10 is secured to said shaft 8 by means of spiders 11, said drum carrying a plurality of resilient pick-up tines 12 extending radially therefrom in a conventional manner. However, these tines are situated spirally along the drum so that any stones picked up are rolled towards the left-hand end of the pick-up (reference Figure 1) and thence discharged onto the ground.

Extending forwardly from adjacent the front end of the side members 4 is a bracing member 13, said member supporting for rotation a ground engaging castoring wheel assembly 14, said wheel 15 being mounted between forks 16 in the conventional manner. In other words, the castoring assembly 14 supports the relatively long forwardly projecting portion of the device adjacent the side member 4.

Means are provided to convey grain picked up by the pick-up 10 to the conventional pick-up 1 and take the form of a plurality of conveyor belts 17 situated between the forward member 6 of the framework and the conventional pick-up 1. These conveyor belts are parallel to the longitudinal axis of the device and are situated in spaced and parallel relationship, stationary spacer plates 18 extending between the front member 6 and the conventional pick-up 1 in alignment with the upper runs 17' of the conveyors. It will be observed that these conveyors increase in length from adjacent member 3 towards member 4 and it should be noted that they are all journalled for rotation at the rear ends thereof upon a shaft 19 carrying drum 20. The forward ends of the conveyors are supported upon drums 21 journalled for rotation upon shaft 22, which in turn are supported within bearings (not illustrated) beneath the spacer plates 18.

Means are provided to drive the conveyors and the pick-up drum 10 and take the form of a sprocket and chain assembly 23 extending around the end of the conventional pick-up 1 and the end of the shaft 19. The opposite end of the conventional pick-up 1 is driven from the combine in the conventional way (not illustrated). A V-belt pulley 24 is secured to the opposite end of shaft 19 to that of the chain and sprocket assembly 23 and a V-belt 25 extends around this pulley and around a pulley 26 secured to the end of the shaft 8 carrying the pick-up drum 10. In this connection, it will be noticed that guide pulleys 27 are provided adjacent one end of the front member 6 in order to change direction of the belt at this point.

From the foregoing, it will be appreciated that the upper runs of the conveyors 17 are adapted to move rearwardly in the direction of arrows 28 and that the pick-up drum 10 is adapted to rotate in the direction of the arrow 29.

In operation, the device is propelled in advance of the combine in a direction of arrow 7, which is parallel to the longitudinal axis of the swath being picked up.

It will, therefore, be seen that the pick-up drum 10 attacks the swath at an acute angle to the longitudinal axis, rather than at a right angle, therefore enabling the tines 10 to engage the stalks more readily. The swath is lifted rearwardly onto the conveyors 17 and then conveyed rearwardly to the conventional pick-up 1.

Finally, reference should be made to the curved guide wires 30 extending from the front member 6 forwardly over the pick-up drum 10 between the pick-up tines 12 in order to prevent the swath being engaged by the drum and carried around thereby.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

In a swath pick-up device for combines, the combination of a pair of spaced parallel side members of unequal length adapted to be secured at one end thereof to the front of a combine and extend forwardly therefrom, a cross member secured to the front ends of said side members and extending obliquely of the space between the same, an elongated pick-up drum rotatably journalled in the front ends of the side members and disposed forwardly of and parallel to said cross member, and a set of spaced parallel conveyor belts extending rearwardly from said cross member in the space between said side members and parallel to the latter.

References Cited in the file of this patent

UNITED STATES PATENTS

| | | |
|---|---|---|
| 2,609,651 | Cymara | Sept. 9, 1952 |
| 2,636,335 | Whitney | Apr. 28, 1953 |
| 2,695,487 | Glienke | Nov. 30, 1954 |
| 2,736,576 | Blada | Feb. 28, 1956 |